United States Patent
Karanjkar et al.

(12)

(10) Patent No.: US 9,058,478 B1
(45) Date of Patent: *Jun. 16, 2015

(54) SYSTEM AND METHOD OF DETERMINING ENTITIES OPERATING ACCOUNTS

(75) Inventors: Sushrut Karanjkar, Fremont, CA (US); Anindo Mukherjee, Mountain View, CA (US); Meenali Rungta, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1439 days.

This patent is subject to a terminal disclaimer.

(21) Appl. No.: 12/534,369

(22) Filed: Aug. 3, 2009

(51) Int. Cl.
*G06F 21/00* (2013.01)
*G06F 21/36* (2013.01)

(52) U.S. Cl.
CPC ...................... *G06F 21/36* (2013.01)

(58) Field of Classification Search
CPC .............................................. G06F 2221/2133
USPC .......................................................... 726/22
See application file for complete search history.

(56) References Cited

U.S. PATENT DOCUMENTS

| 7,307,997 | B2* | 12/2007 | Vinokurov et al. | 370/401 |
| 2005/0097319 | A1* | 5/2005 | Zhu et al. | 713/166 |
| 2007/0094157 | A1* | 4/2007 | Flinn et al. | 706/2 |
| 2008/0263636 | A1* | 10/2008 | Gusler et al. | 726/4 |
| 2010/0287132 | A1* | 11/2010 | Hauser | 706/52 |
| 2010/0287228 | A1* | 11/2010 | Hauser | 709/203 |
| 2010/0287229 | A1* | 11/2010 | Hauser | 709/203 |
| 2011/0131652 | A1* | 6/2011 | Robinson et al. | 726/22 |
| 2012/0047426 | A1* | 2/2012 | Hauser | 715/234 |

* cited by examiner

*Primary Examiner* — Tamara T Kyle
(74) *Attorney, Agent, or Firm* — Lerner, David, Littenberg, Krumholz & Mentlik, LLP

(57) ABSTRACT

A system is provided that determines the likelihood of an account is being used by a computer program to automatically generate and send information to other accounts. In one aspect, the system calculates the likelihood for one account based on the amount of the account's social interaction with other accounts and the likelihood that such other accounts and are being used by a computer program to automatically generate and send information to other accounts.

19 Claims, 16 Drawing Sheets

FIGURE 11

SYSTEM AND METHOD OF DETERMINING ENTITIES OPERATING ACCOUNTS

BACKGROUND OF THE INVENTION

A variety of computerized services, such as Google's Gmail service, allow users to create accounts and access information based on the account. By way of example, users may access email, calendars, custom searches that automatically and periodically run at times defined by the user, documents, and more.

In part because of the flexibility such services provide, some of the users may use such systems in manner that is contrary to the system's operator's intended purpose. For instance, some people may create an account and then use a computer program to automatically generate and send unsolicited email to other users via the account. Indeed, some computer programs may be configured to automatically open and send or receive information on accounts without any participation by a person at all beyond installing and configuring the program.

A variety of systems and methods have been proposed to detect the presence of such computer-controlled accounts, such as CAPTCHAs. Certain systems heretofore also attempt to detect computer-controlled accounts by monitoring the activity of the account for the first few days or longer and comparing the account characteristics that are set by the user with known suspicious activity, such as an excessive quantity of activity, activity that appears randomly generated, opening an account from an IP address with a history of questionable activities and suspicious passwords.

BRIEF SUMMARY OF THE INVENTION

In one aspect, a method is provided that includes determining, with a processor and for each account within a set of user accounts associated with a computer, a humanlike value based on the extent to which an account has the characteristics of sending or receiving data based on the active participation of a human instead of a computer program. The method also identifies interaction information with a processor, where interaction information comprises information provided by a first account of the set to a second account of the set and determines, with a processor and for the second account, a humanlike value based on the humanlike value of the first account and the interaction information. The method further restricts access by the second account to information available via the second account depending on the second account's humanlike value.

Another method in accordance with another aspect includes determining, with a processor and for each account within a set of user accounts associated with a computer, a humanlike value based on the extent to which an account has the characteristics of sending or receiving data based on the active participation of a human instead of a computer program. The method also identifies interaction information with a processor, where interaction information comprises the type of information provided by a first account to a second account and the quantity of the type of information, and determines, with a processor and for the second account, a humanlike value based on the humanlike value of the first account and the interaction information. It further restricts access by the second account to information available via the second account depending on the second account's humanlike value.

Still another method relates to a computerized method of providing, with a computer system, information based on the type and number of transactions engaged in by accounts as well as other information. The method includes determining for each account within a set of accounts accessed via a network, a first value representative of the type and number of transactions engaged in by the account that were initiated by another account. It also includes determining, for each account within the set of accounts, a second value representative of the extent to which the account has the characteristics of sending or receiving data based on the active participation of a human instead of a computer program, the second value being based on information other than the type and number of transactions. The method calculates, for a plurality of the accounts within the set of accounts, a third value based on the account's first value and the second value associated with the other accounts providing messages to the account. When a request for data from a user associated with an account is received over a network, the method selects information to display to the user based on the third value and in response to the request and outputs the selected information from the computer system to the user via the network.

Another aspect relates to a system that includes a first computer at a first node of a network (the first computer having access to a set of instructions operable by the first computer, user data identifying users accessing data over the network, humanlike values associated with the users, interaction data identifying information provided by the identified users to other identified users) and a client device at a second node of the network different from the first node (the client device comprising a user input device, an electronic display, a processor and instructions operable by the processor). The instructions of the client device include: transmitting an identification of the user to the first computer, transmitting a request for information to the first computer, and displaying, on the electronic display, the information transmitted by the first computer. The instructions of the first computer include receiving the identification of the user and the request for information from the client device, and transmitting either the requested information or other information depending on a first value associated with the user. The first value is based on the quantity of interactions between the identified user and other users as identified by the interaction data, and the likelihood that the other users used a computer program to automatically generate and transmit information to other users.

A system in accordance with a different aspect includes a processor, instructions operable by the processor, an electronic memory storing the instructions, and an electronic memory storing data accessed by the processor. The instructions include determining, for a second user within a set of users identified by the data stored in the memory, a first value based on the amount of information received by the first user from a second user within the set, where the amount of information is based on the type of the information. The instructions also include determining, for a third user within the set, a second value based on the first value and the amount of information received by the third user from the second user and the first value. Finally, the instructions relate to providing information to be displayed to the second user based on the second value and information to be displayed to the third user based on the third value.

Yet a further system in accordance with one aspect also includes a processor, instructions operable by the processor, an electronic memory storing the instructions, and an electronic memory storing data accessed by the processor. In this aspect, the instructions include: determining, for each user within a set of users identified by the data stored in the memory, a message-amount value based on the number of messages received by the user from other users; determining, for each user within the set of users, a program-likelihood value based on the likelihood that the user is using a computer program to automatically generate and send information to other users with the set; iterating through the users and modifying the program-likelihood value of each user based on the message-amount value of the user; repeating the iterating; and restricting a user's access to the information dependant on a comparison of the user's program-likelihood value with a threshold.

A further aspect relates to a computer-usable medium including a program executable by a processor. The medium comprises: computer code that determines for each account within a set of user accounts associated with a computer, a humanlike value based on the extent to which an account has the characteristics of sending or receiving data based on the active participation of a human instead of a computer program; computer code that identifies interaction information with a processor, where interaction information comprises information provided by a first account of the set to a second account of the set; computer code that determines with a processor and for the second account, a humanlike value based on the humanlike value of the first account and the interaction information; and computer code that restricts access by the second account to information available via the second account depending on the second account's humanlike value.

BRIEF DESCRIPTION OF THE DRAWINGS

FIG. 11 is a screen shot in accordance with an aspect of the system.

DETAILED DESCRIPTION

In one aspect, a system and method is provided that determines the likelihood that an account is being used by a computer program to automatically generate and send information to other accounts. The determination may be based on the amount of the account's social interaction with other accounts and the likelihood that such other accounts and are being used by a computer program to automatically generate and send information to other accounts.

Figure 1:
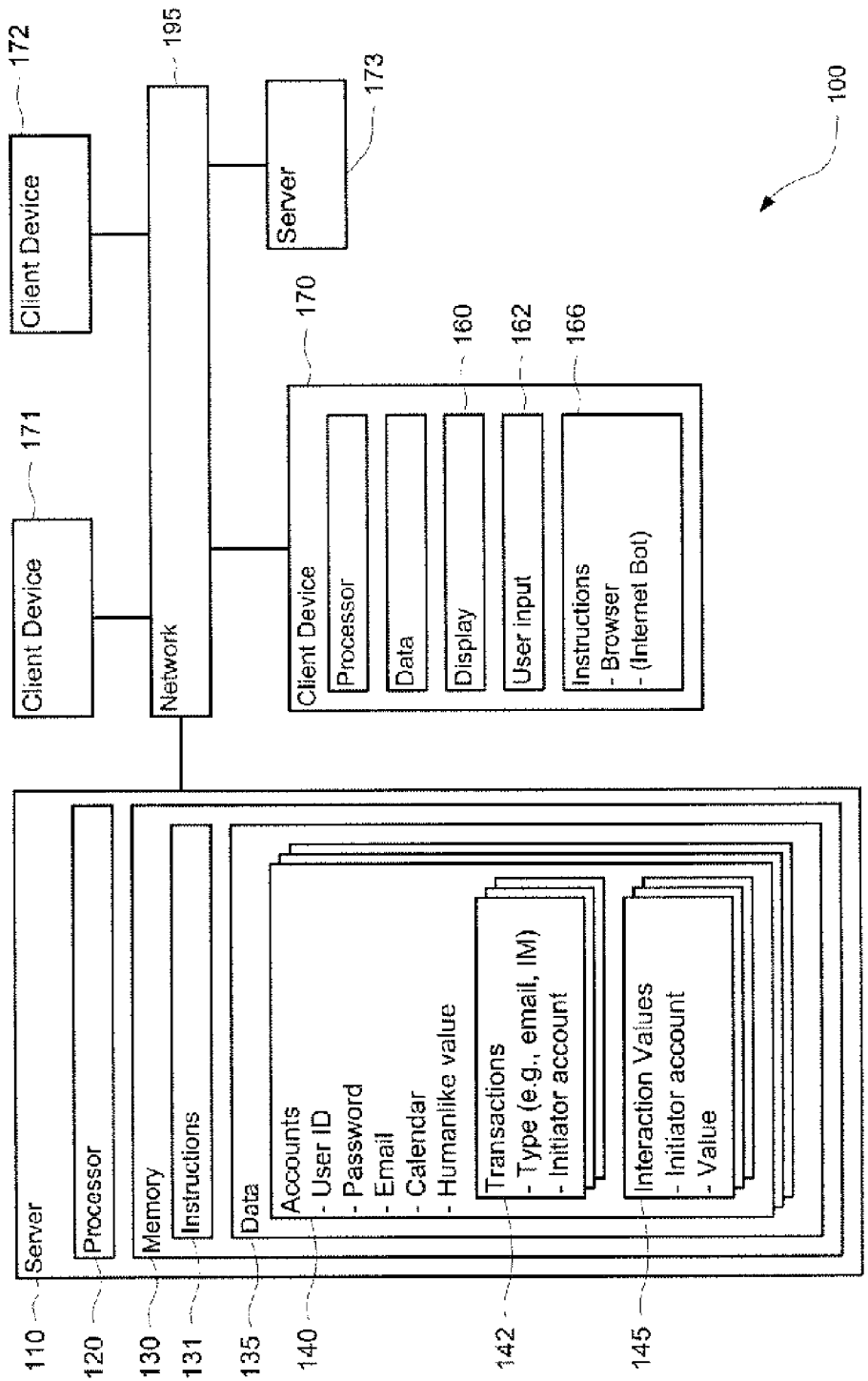
FIG. 1 is a functional diagram of a system in accordance with an aspect of the system.
Figure 2:
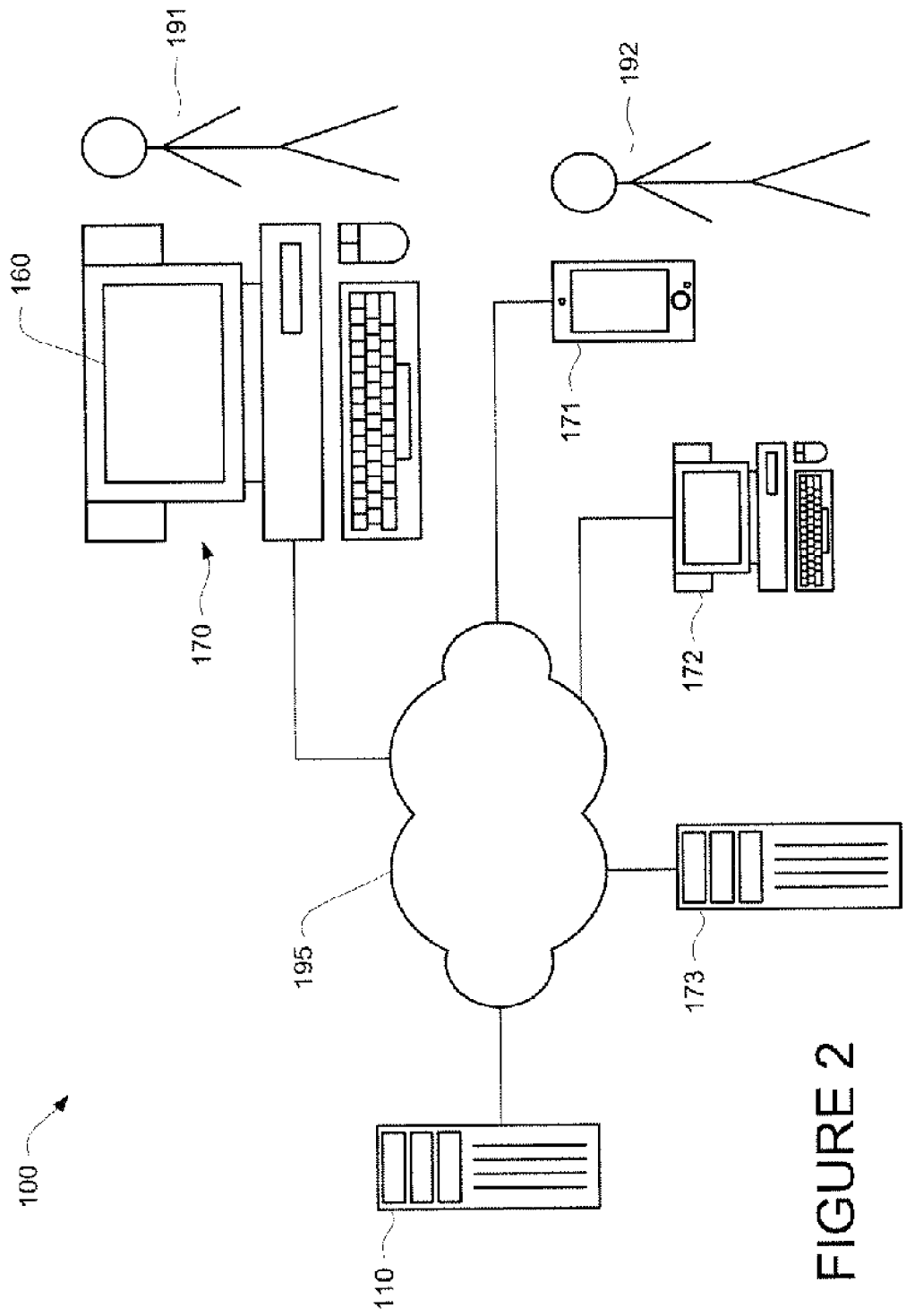
FIG. 2 is a pictorial diagram of a system in accordance with an aspect of the system.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium such as a hard-drive, memory card, ROM, RAM, DVD or other optical disks, as well as other write-capable and read-only memories. The system may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 170-73 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions 166. Each client device may be a personal computer intended for use by a person 190-191, and have all of the components normally used in connection with a personal computer such as a central processing unit (CPU), memory (e.g., RAM and internal hard drives) storing data and instructions, an electronic display 160 (e.g., a monitor having a screen, a small LCD touch-screen, a projector, a television, or any other electrical device that is operable to display information), user input 162 (e.g., a mouse, keyboard, touch-screen or microphone), camera, speakers, a network interface device, and all of the components used for connecting these elements to one another. The instructions of the client device may include an Internet browser.

Although the client devices 170-73 may comprise a full-sized personal computer, the system may also be used in connection with mobile devices capable of wirelessly exchanging data with a server over a network such as the Internet. By way of example only, client device 172 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system may be implemented by a single computer having a single processor.

Data 135 may include account information 140, where accounts identify entities that interact with the server (such as a business or consumers) and are associated with information exchanged between the accounts or between entities and the server. For example, the account may comprise an email account where the account identifies a user of one of the client devices based on an email address (e.g., JoeSmith@a.com), and the exchanged information includes emails sent to or from that address (e.g., server 110 is located on the Internet at www.a.com). Yet further, the account may comprise a group calendar where: the information is a calendar (e.g., a baseball schedule); the account is identified by a group user name (e.g., "SpringfieldLittleLeague") as well as individual user names (e.g., "Bobby") and; multiple people from various locations on the Internet access the calendar (e.g., coaches that add games to the calendar and parents that access to find upcoming baseball games). By further way of example, the server 110 may comprise a search engine, and the account is used to access the information available via the search engine. The system may also accommodate combinations of the foregoing as well as other types of accounts.

Figure 3:
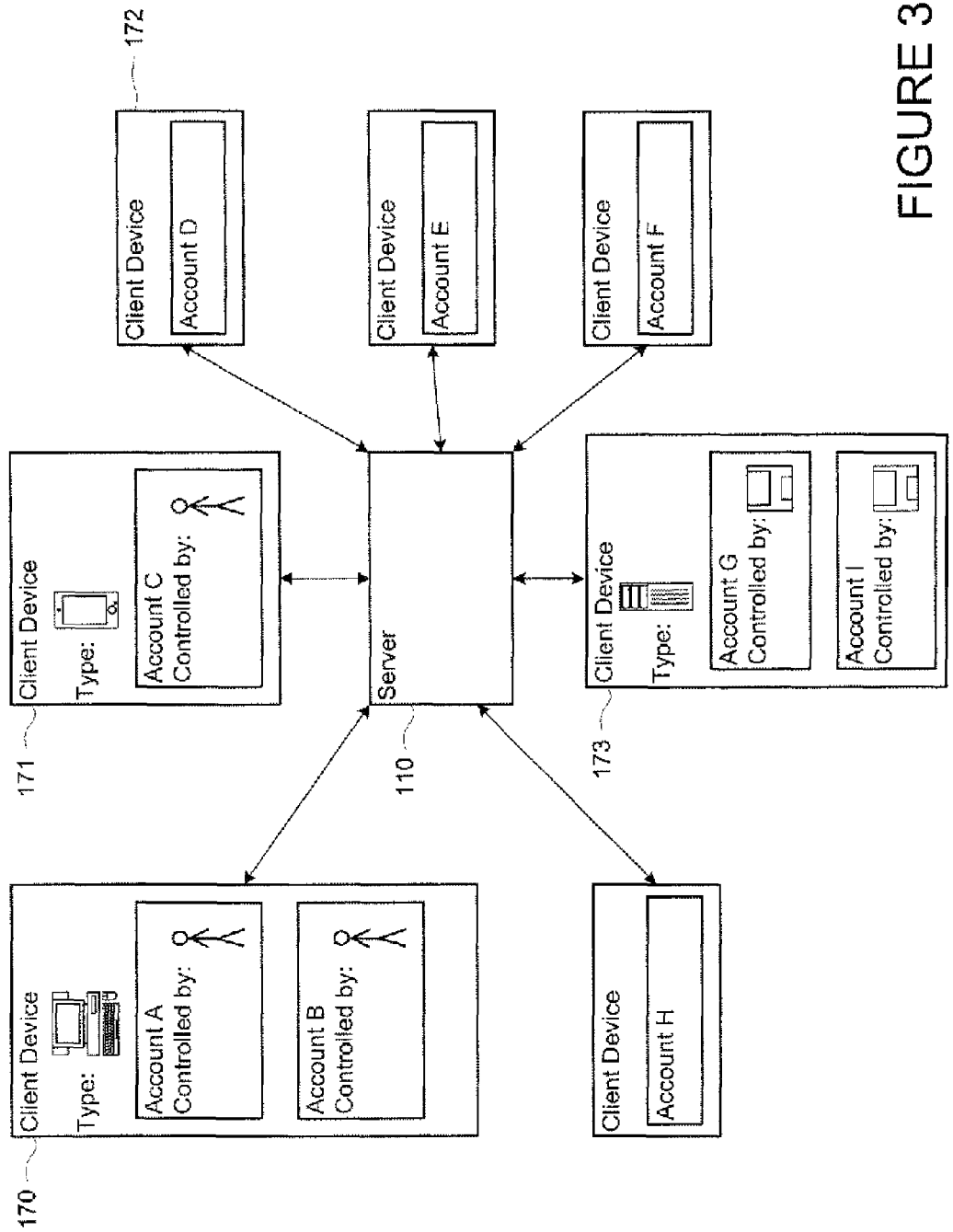
FIG. 3 is a functional diagram of accounts and their relationship to client devices in accordance with an aspect of the system.

A single or many accounts may be associated with a single client device or node of the network. For example, as shown in FIG. 3, Accounts A and B may be typically accessed by two people sharing a personal computer 170, whereas Account C may be typically accessed by a person accessing server 110 via a cell phone 171. Yet further, some accounts may send or receive information primarily under the control of computer programs, such as Accounts G and I which are primarily accessed by the same program running on the same server 173.

As shown in FIG. 1, each account 140 may be associated with multiple transactions 142 with other accounts. For example, in the context of an email account, a transaction may comprise an email sent from one account to another account. In the context of a group calendar, a transaction may comprise one user uploading an event and another user accessing the date, such as when one user sends an invite to an event to another user. In that regard, the data 140 may identify the type of information exchanged such as whether the information is an email, calendar invite, instant message or any other message.

Because transactions relate to the exchange of information between two or more accounts, the system may identify one account as the initiator of the exchange and one or more accounts as the target(s). By way of example, when examining emails in accordance with the methods described herein, the system may identify the sender of an email as the initiator, the recipient as the target, and the type as "email." In that regard, each account 140 may be associated with multiple transactions, where each transaction identifies an initiator account.

Each account may further be associated with a humanlike value and multiple interaction values 145, which are described in more detail below.

Figure 14:
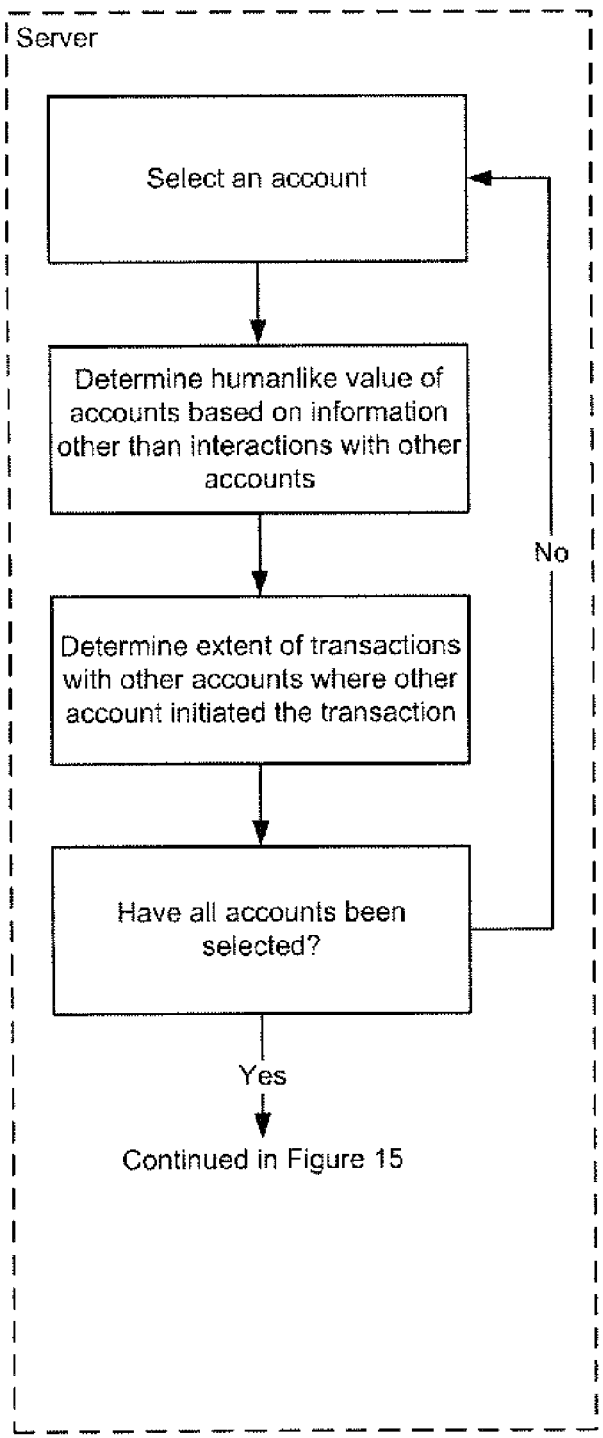
FIG. 14 is a flowchart in accordance with an aspect of the system.
Figure 15:
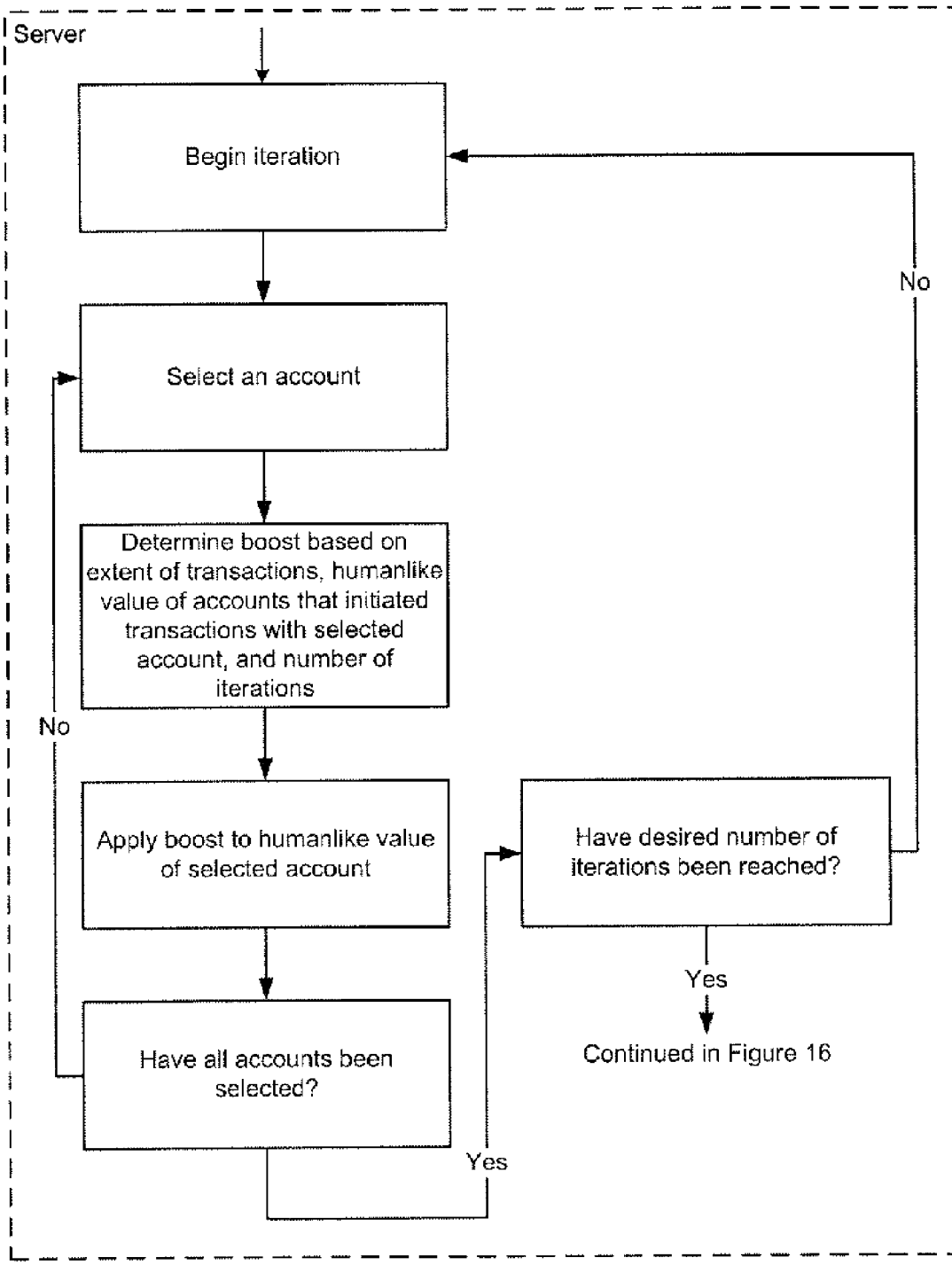
FIG. 15 is a flowchart in accordance with an aspect of the system.
Figure 16:
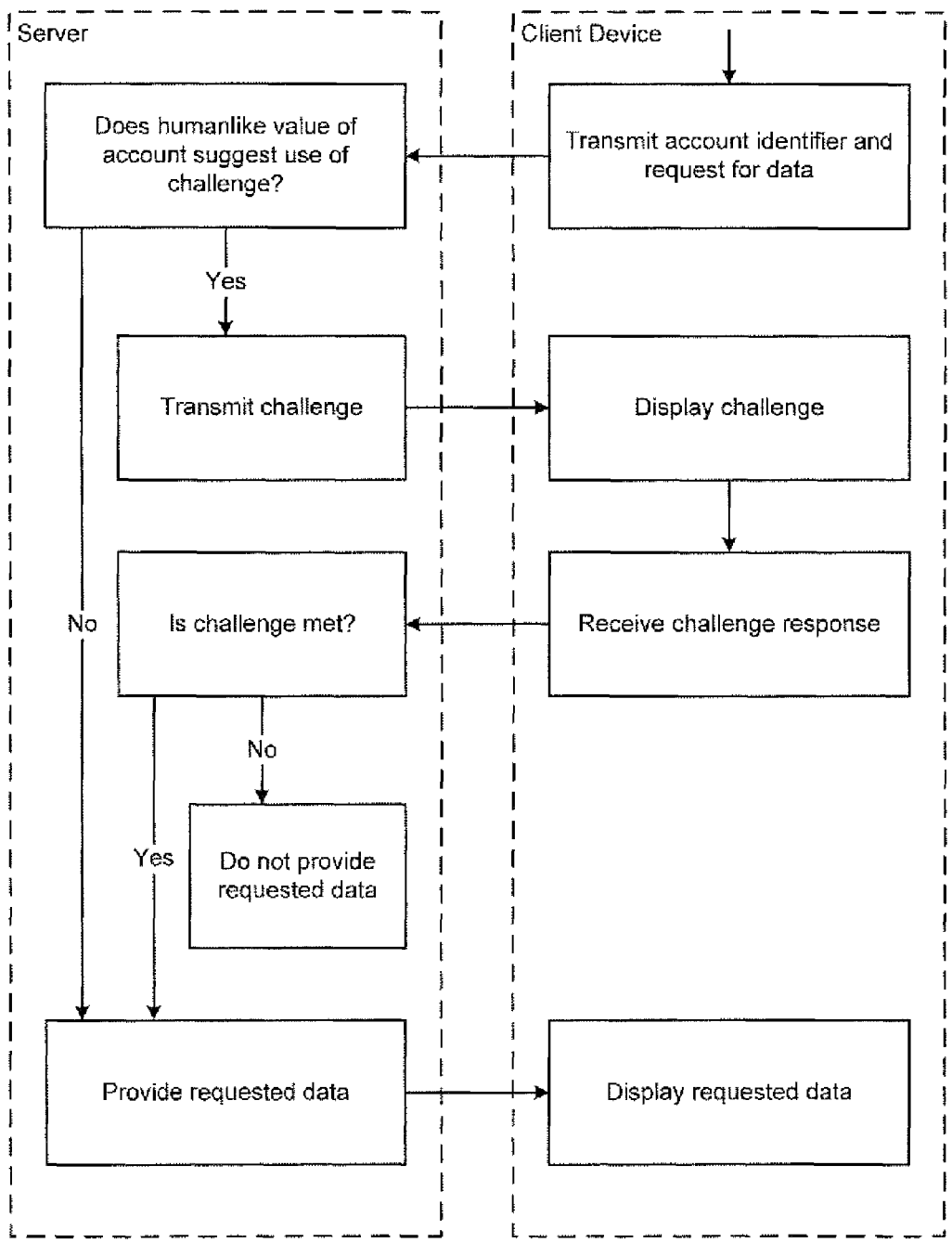
FIG. 16 is a flowchart in accordance with an aspect of the system.

In addition to the operations illustrated in FIGS. 14-16, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, systems in accordance with the present invention may include different data values, types and configurations, and may be provided and received at different times (e.g., via different web pages) and by different entities (e.g., some values may be pre-suggested or provided from different sources).

The system may assign each account a value that indicates the extent to which an account has the characteristics of sending or receiving data based on the active participation of a human. For ease of reading purposes only and not by limitation, such a value may be referred to herein as a "humanlike value," where a relatively high value is considered highly characteristic of human involvement with the account and a relatively low value is considered highly characteristic of a program's automated involvement with the account. By way of example, the server may assign a low humanlike value to the account if it has the characteristics of being operated by an Internet bot that repetitively generates and sends spam to a list of email addresses contained in a database. Yet further, the account may be used by a person to legitimately transmit email and also, unknown to the person, used by a virus to transmit spam.

A humanlike value may be determined for each account based on various information, including the extent to which other accounts initiated transactions with the account. However, the system may also determine the humanlike value based on other information. For example, some users may perform searches of the information available via server 110 (e.g., searching for a local restaurant) in addition to using the server 110 to check their email. The operators of the system may assume that while many Internet bots may use as account to send unsolicited email, bots tend not to use an account to perform searches. Accordingly, the system may assign a value to searches, e.g., each different search is considered "1 point". It may also assign more or less points based on the timing and type of the searches, e.g., if the server receives searches from an account far faster than any human could type them, the server 110 may deduct points from the humanlike value based on the searches. Other techniques for determining the humanlike value based on non-transactional information may also be used.

The system may also calculate a value based on the extent to which information exchanged between accounts is characteristic of the information being sent or received with the active participation of a human.

Figure 4:
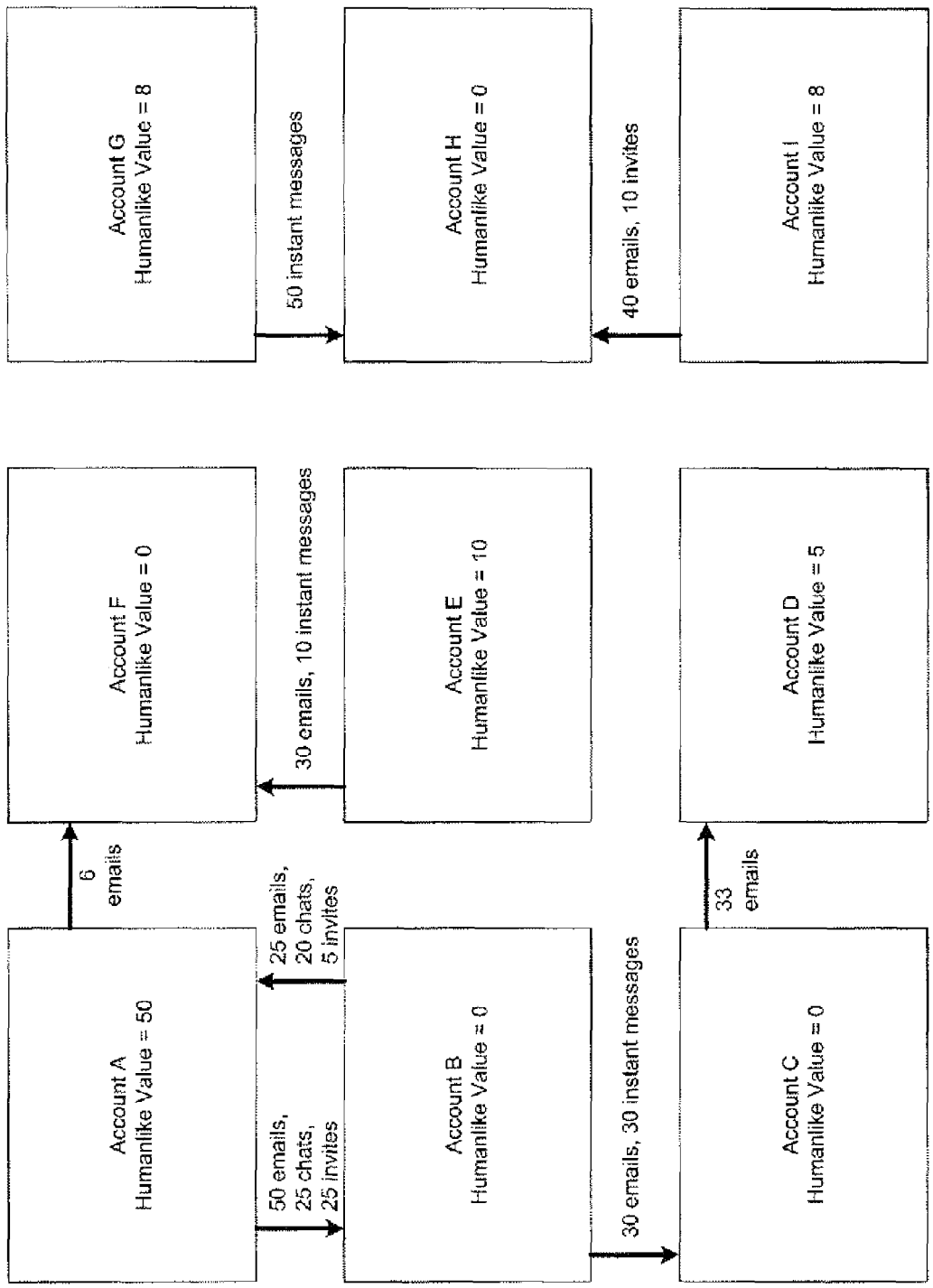
FIG. 4 is a functional diagram of examples of account-related data in accordance with an aspect of the system.

For instance, the system may determine whether one account provided data to another account in a manner typically associated with a social interaction between humans, such as receiving email, instant messages, calendar meeting invites, engaging in a chat with another account, sharing a photo album, etc. By way of example only, and as shown in FIG. 4, the system may determine that Account A engaged in 100 transactions, namely it sent 50 emails, 25 chat invitations and 25 calendar invites to Account B. It may also determine that Account A sent 6 emails to Account F, and that Account sent 30 emails and 30 instant messages to Account C. FIG. 4 shows examples of other transactions as well, as well as the humanlike values that may have been determined as set forth above.

The system may further ascribe a value indicative of the extent of the interaction between any two accounts (hereafter, an "interaction value"). For instance, the system may assign a value of "1" to each qualifying transaction (e.g., each email, each initiation of a chat, each calendar invite, etc.) and total the values. The value may further be based on the frequency of the transactions, e.g., the number of transactions performed by an account during the week immediately prior to the calculation of the account's humanlike value.

The interaction value may also be calculated based on other parameters. For example, the interaction value may be stored as a percentage relative to 100 transactions, where interactions totaling over transactions are assigned an interaction value of 100% and interactions totaling less than 100 transactions are assigned an interaction value equal to the total transactions divided by 100.

The system may further determine interaction values dependant on which account initiated each transaction. For example, many viruses are designed to take control of an account and send unsolicited emails. Therefore, the number of emails sent by an account may not provide a meaningful measure of whether an account is under the control of a human. However, most humans and many viruses may tend to prefer to send emails to humans; thus, the number of emails received by an account may be helpful in determining the humanlike value. In that regard, when analyzing emails, the system may associate the interaction value of the email to the recipient but not the sender.

Figure 5:
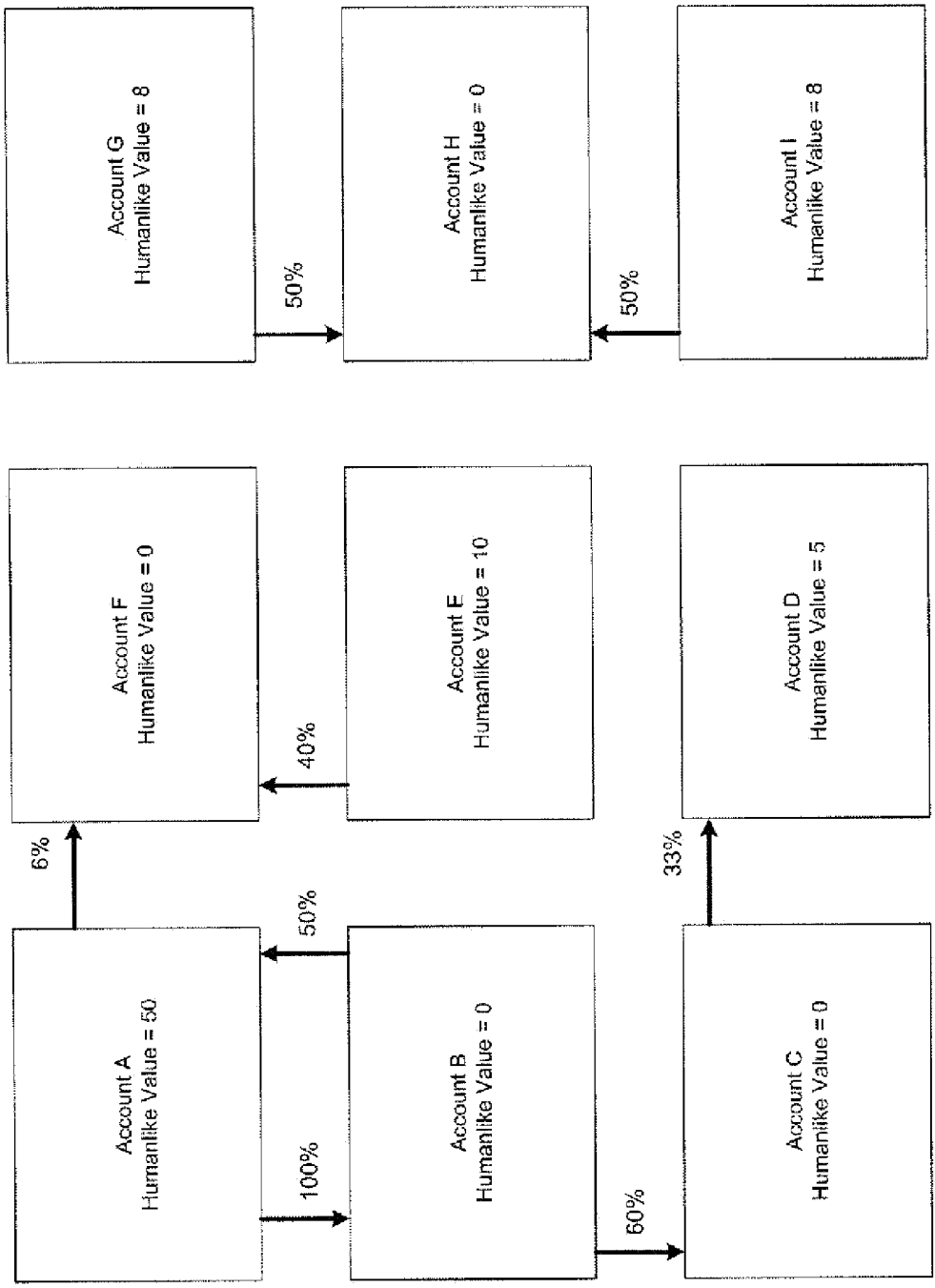
FIG. 5 is a functional diagram of examples of account-related data in accordance with an aspect of the system.

FIG. 5 illustrates sample interaction values. As noted in the figure, the one hundred transactions initiated by Account A with respect to Account B has been assigned the interaction value of 100% and the interactions in the opposite direction were assigned the interaction value of 50%. Similar interaction values are shown between other accounts.

The system may modify the humanlike value of an account based on the weight of its interactions with other accounts and the humanlike value of the accounts with which it interacted.

Figure 6:
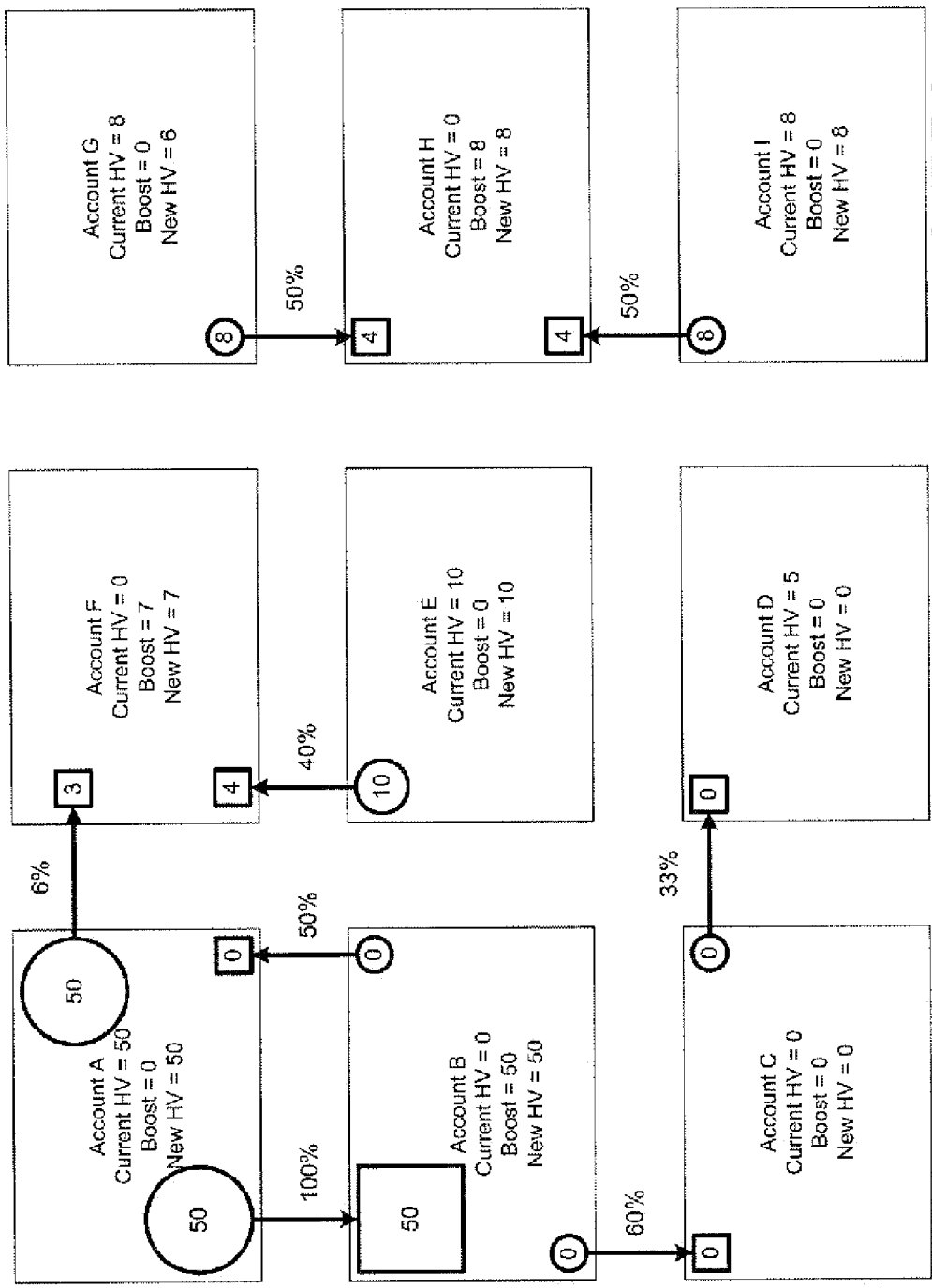
FIG. 6 is a functional diagram of examples of account-related data in accordance with an aspect of the system.

As shown in the sample data of FIG. 6, the system may have initially calculated a humanlike value of zero for Account B. However, Account B was the target of a high number of transactions from Account A, which has an initially high humanlike value. As a result, Account B's humanlike value will receive a boost from the humanlike value of Account A. Specifically, if the interaction value of the transactions initiated by Account A with respect to Account B is 100%, and the humanlike value of Account A is 50 points, Account A may convey a relatively large boost of 50 points to the humanlike value of Account B.

The modification of the humanlike value of an account may be based on a function taking a variety of parameters. By way of example only, just one possible function may comprise:

$$\text{Boost}(v) = \Sigma(\text{Interaction}(u \rightarrow v) * \text{Human}(u) * \text{IterationMod}(n)),$$

where:
v=account being analyzed;
Boost(v)=modification to humanlike value of account v
u=an account that initiated transactions with v;
Interaction(u→v)=interaction value of transactions initiated by u with v;
Human(u)=humanlike value of u;
n=number of iterations through accounts;
IterationMod(n)=modifier to apply based on number of iterations
(e.g., IM(n)=½ ^n−1)); and
Σ=sum based on all accounts initiating transactions with v.

As shown in FIG. 6, the boost to the humanlike value of Account B on the first iteration through the accounts would be 50 points where Interaction(A→B)=100%, Human(A)=50 and IterationMod(n)=1. Therefore, Account B's new humanlike value after the boost would be 50 points if it started with zero points.

The boost to an account's humanlike value may come from multiple accounts. For example, Account F receives a total boost of 7 points due to a 3 point boost from Account A (50 points*6%) and a 4 point boost from Account E (10 points*40%).

As can also be seen in connection with Accounts A and F, some accounts may receive relatively little boost in spite of the fact that the initiator account has a high humanlike value. Account A gave Account F a relatively small boost (3 points) compared to the boost it gave Account B (50 points) because Account A initiated far less transactions with Account F (6%) than Account B (100%).

Moreover, as shown throughout FIG. 6, some accounts received no boost in spite of being the target of a large number of transactions. For example, Account C was the recipient of 30 emails and 30 instant messages from Account B, yet it received no boost because Account B had a humanlike value of zero. Accordingly, while there was a great deal of weight to the interactions from Account B to Account C, Account B had no humanness to convey when the boost was calculated. Similarly, both Accounts G and I may have sent quite a few emails to Account H, yet Account H received relatively little boost from the two accounts even in combination because Accounts G and I had relatively low humanlike values.

Figure 7:
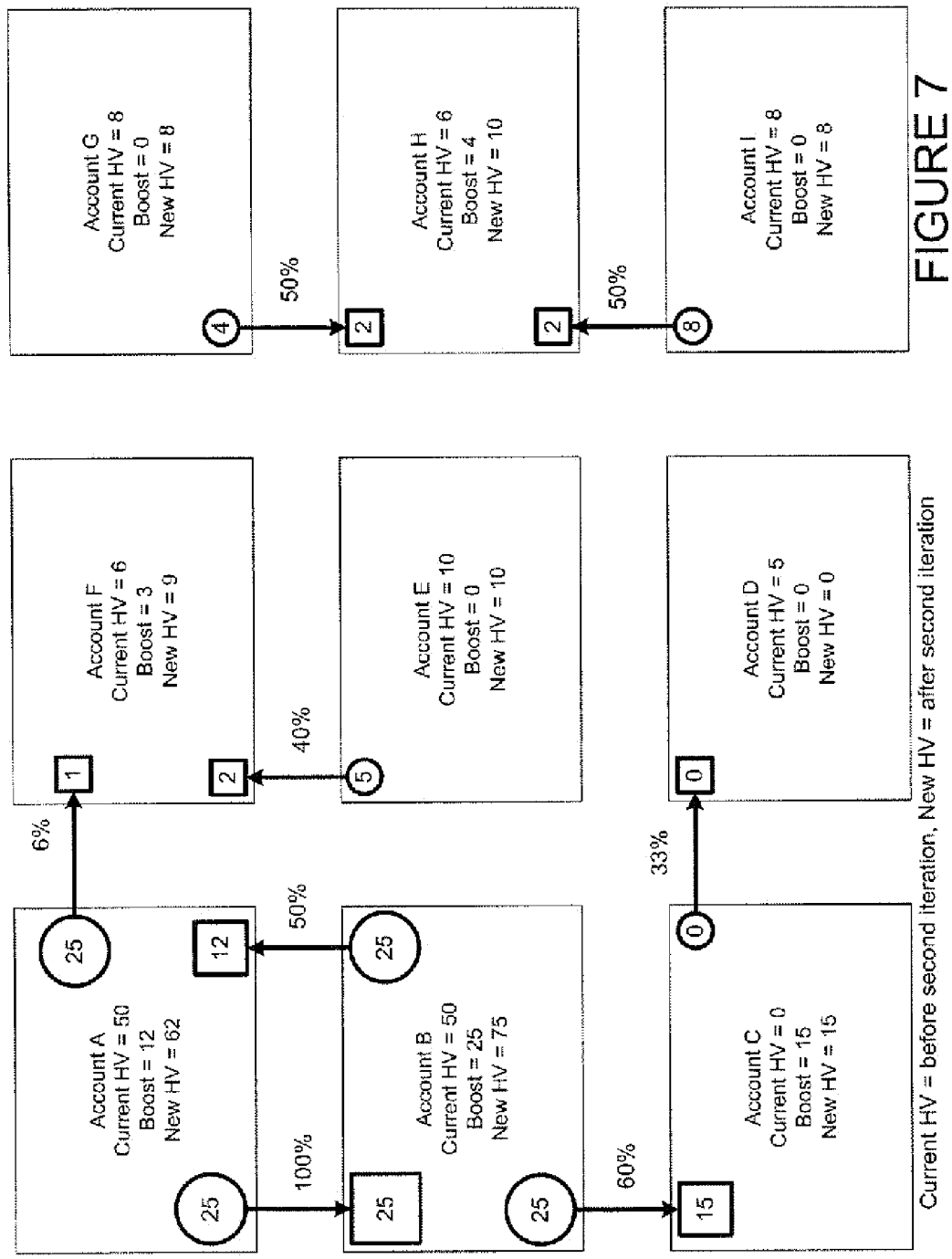
FIG. 7 is a functional diagram of examples of account-related data in accordance with an aspect of the system.

In one aspect, the system may go through the accounts a second, third or more times. Each account that received a boost from an initiating account in a prior iteration may convey a portion of that boost to its own target accounts. One manner in which the system may do this is to repeat the foregoing process based on the boosted humanlike value. Therefore, while Account B may have had zero points to convey to other accounts at the start of the first iteration (FIG. 6), it has 50 points to convey to other accounts at the start of the second iteration. FIG. 7 illustrates sample values when the system iterates though the accounts a second time.

In one aspect, the system decreases the impact of the boosts with each iteration. As indicated in the Boost(v) formula above, the system may apply half of the usual boost during the second iteration (IterationMod(2nd iteration)=$\frac{1}{2}^{(2-1)}=\frac{1}{2}$). As shown in FIG. 7, Account A is still conveys a boost to Account B during the second iteration, but instead of conveying all 50 points of its current humanlike value it conveys half, namely 25 points. The system similarly only uses half of Account A's humanlike value when determining the boost to Account F (e.g., 50 points*6% interaction*0.5 modifier=1.5=~1).

In that regard, the amount of boost may change based on the amount of times that a boost is applied to the accounts.

In one aspect, the humanlike value of one account may be used to modify accounts with which it did not interact. As shown in FIG. 6, all of Account B's humanlike value resulted from a boost from Account A. After the second iteration shown in FIG. 7, Account B's boosted value is used to boost Account C, namely 60% of half of its 50 points are applied to Account C. Accordingly, at least a portion of one account's humanlike value (Account A) was passed through another account (Account B) to a third account (Account C).

In another aspect, the humanlike value of an account may increase based on its own humanlike value if it both initiated and received transactions with other accounts. As noted above, all of Account B's humanlike value at the end of the first iteration resulted from its interactions with Account A. When the second iteration occur, Account B's boosted value of 50 points may be applied to Account A because Account B initiated its own interactions with Account A. At the end of the second iteration, Account A thus receives a boost of 12 points from Account B (50 points*50% interaction*0.5 modifier=12.5=~12)—in spite of the fact that these points are based on Account A's own humanlike value.

Figure 8:
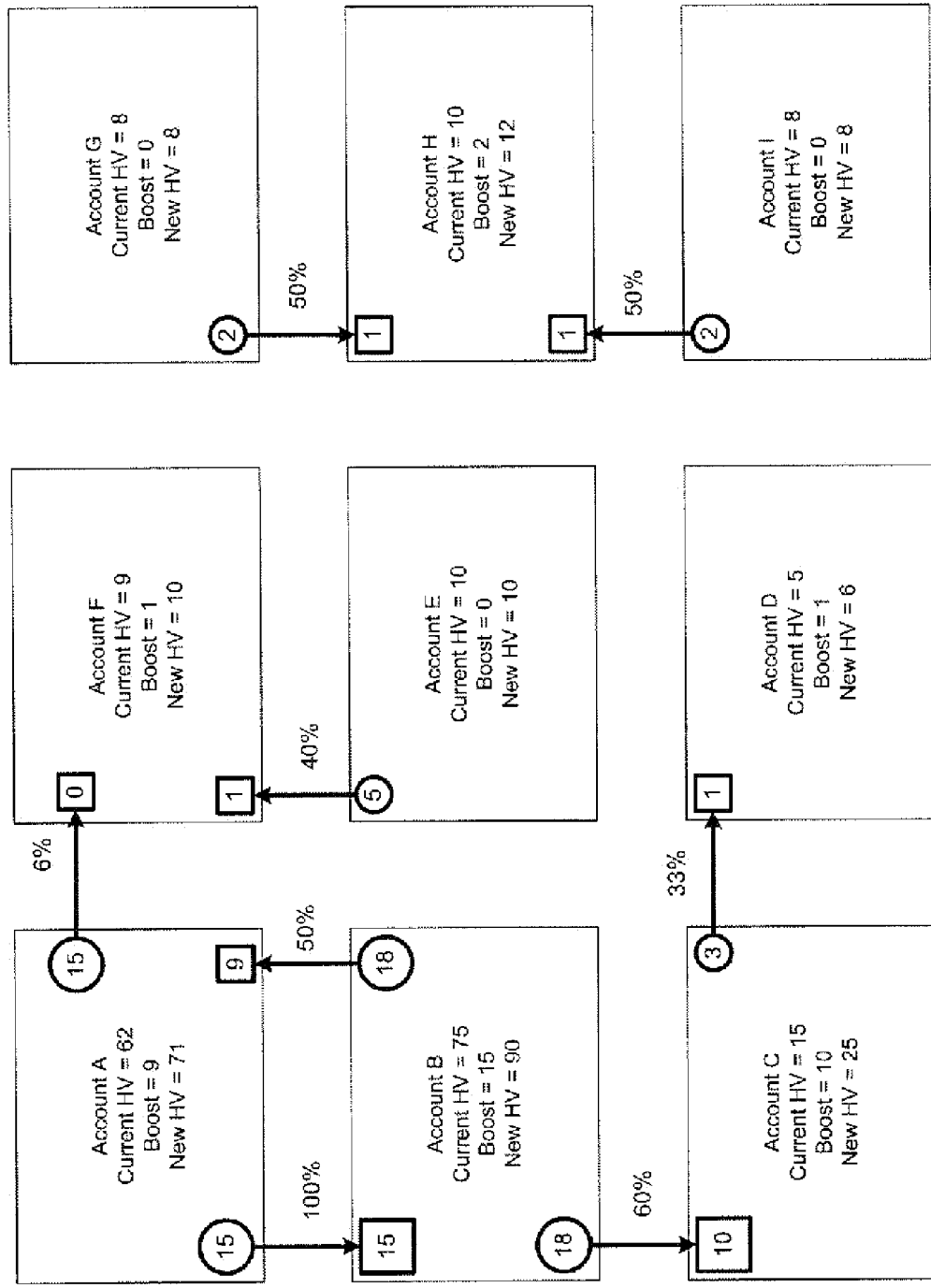
FIG. 8 is a functional diagram of examples of account-related data in accordance with an aspect of the system.

The process of increasing humanlike values based on the humanlike value of other accounts and the extent of the interactions with other accounts may be repeated continuously. FIG. 8 illustrates the sample values of Accounts A-I at the start and end of a third iteration. Due to the iteration modifier, the system transfers at most one-eighth of an account's humanlike value to other accounts. The iteration modifier thus dampens the impact of the boost with each subsequent iteration.

As also shown in FIG. 8, yet a third account (Account D) has received a boost due to Account A's humanlike value. Its boost is a small portion of the Account A's original humanlike value of 50 points due at least in part to the intervening interaction values, namely, 100% from A to B, 60% from B to C, and 33% from C to D. Even so, because of the iteration modifier, Account D would not have received the full value of Account A's humanlike value even if the intervening interaction values were at a maximum of 100%.

Accordingly, in one aspect, a second account's humanlike value is based not only on the humanlike value of a first account with which it is indirectly connected via interactions; it is also based on the number of intervening accounts within the connection.

FIG. 8 also illustrates that an account may receive no boost in spite of boosting other accounts. Accounts G and I may boost Account H but, because they receive no qualifying interactions initiated by another account, they received no boost.

The system may continue to iterate and propagate humanlike values from one account to another until a termination criteria is satisfied. By way of example, the termination criteria may comprise iterating through all of accounts a specific number of times, e.g., three times as shown in FIG. 8. Alternatively, it may continue iterating until the lowest boost conveyed by any initiator account to a target account is below some threshold. Other termination criteria may also be used.

Figure 9:
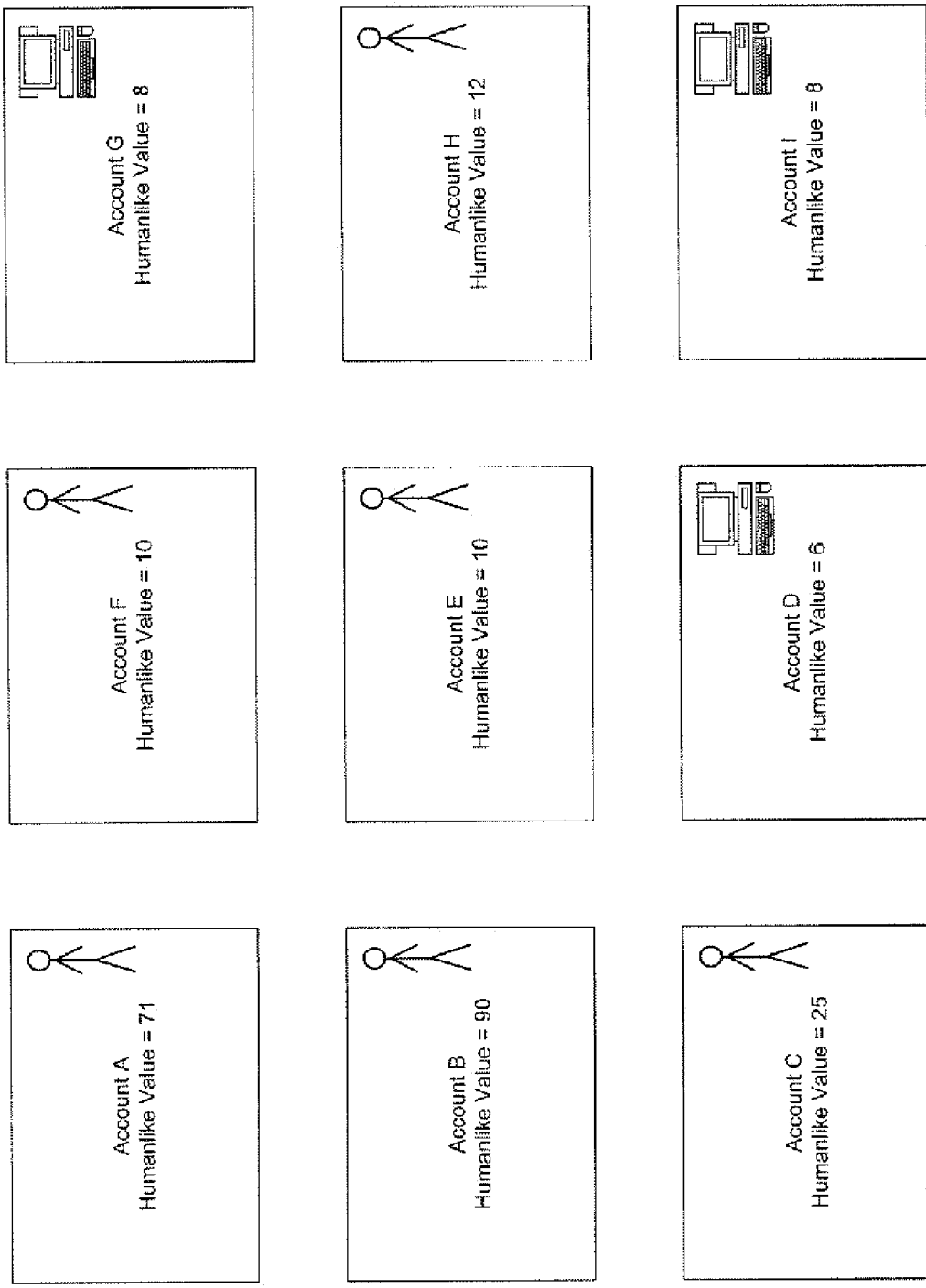
FIG. 9 is a functional diagram of examples of account-related data in accordance with an aspect of the system.

After the humanlike values have been determined based on interactions, the system may further determine, based on the humanlike value, whether the data sent or received via the account is likely being sent with the active participation of a computer program instead of a human. For instance and as shown by the person and computer symbols in FIG. 9, the system may determine that any account having a humanlike value less than a threshold of 10 has a sufficient likelihood of being primarily operated by a computer. It will be understood that the threshold need not be predetermined number such as 10, but may comprise any value against which the humanlike value is compared.

The system may take additional action based on whether it determines an account is likely operated by a computer instead of a user, or vice versa.

By way of example only, the system may restrict other information sent to or received from an account, such as limiting the total number of emails that may be sent with the account. It may also prevent access altogether by cancelling the account.

Figure 10:
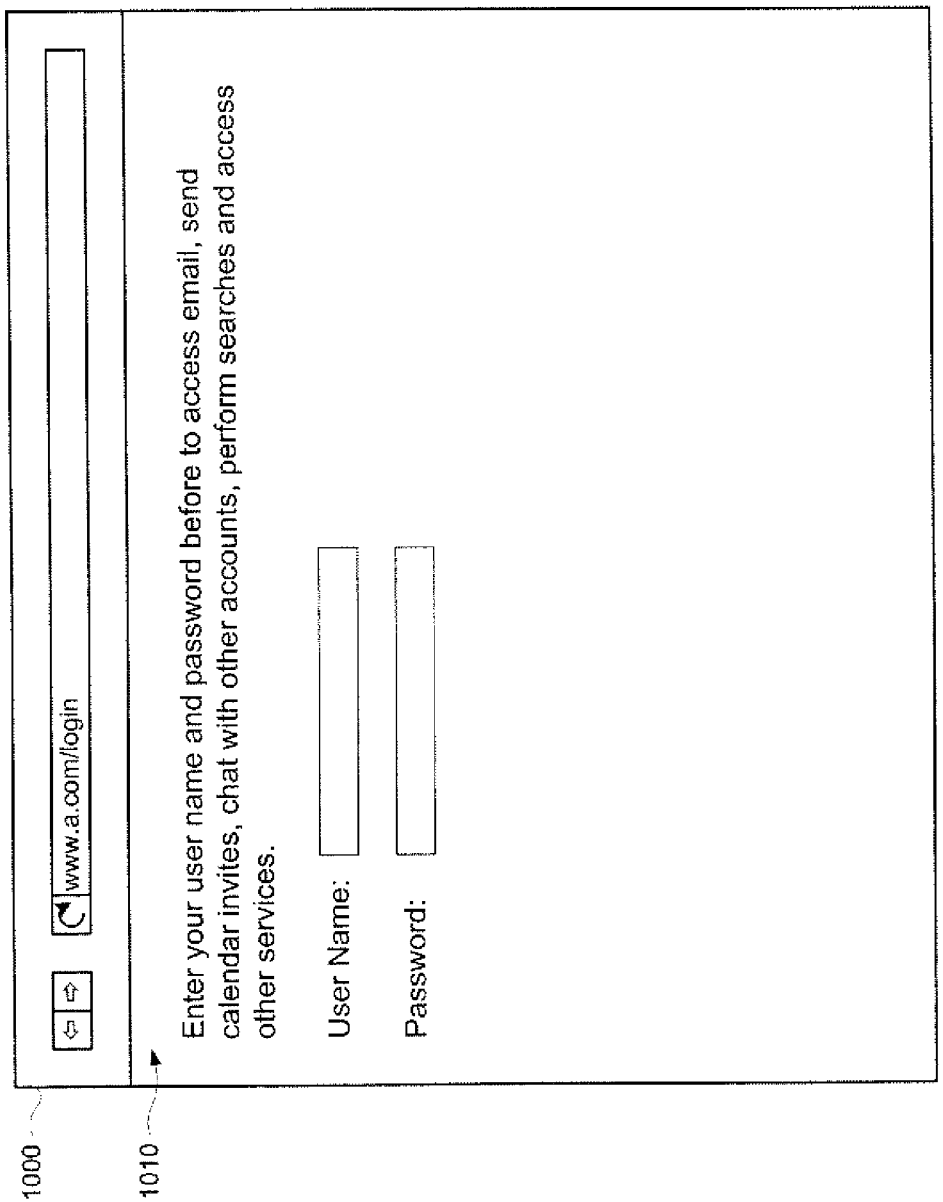
FIG. 10 is a screen shot in accordance with an aspect of the system.
Figure 11:
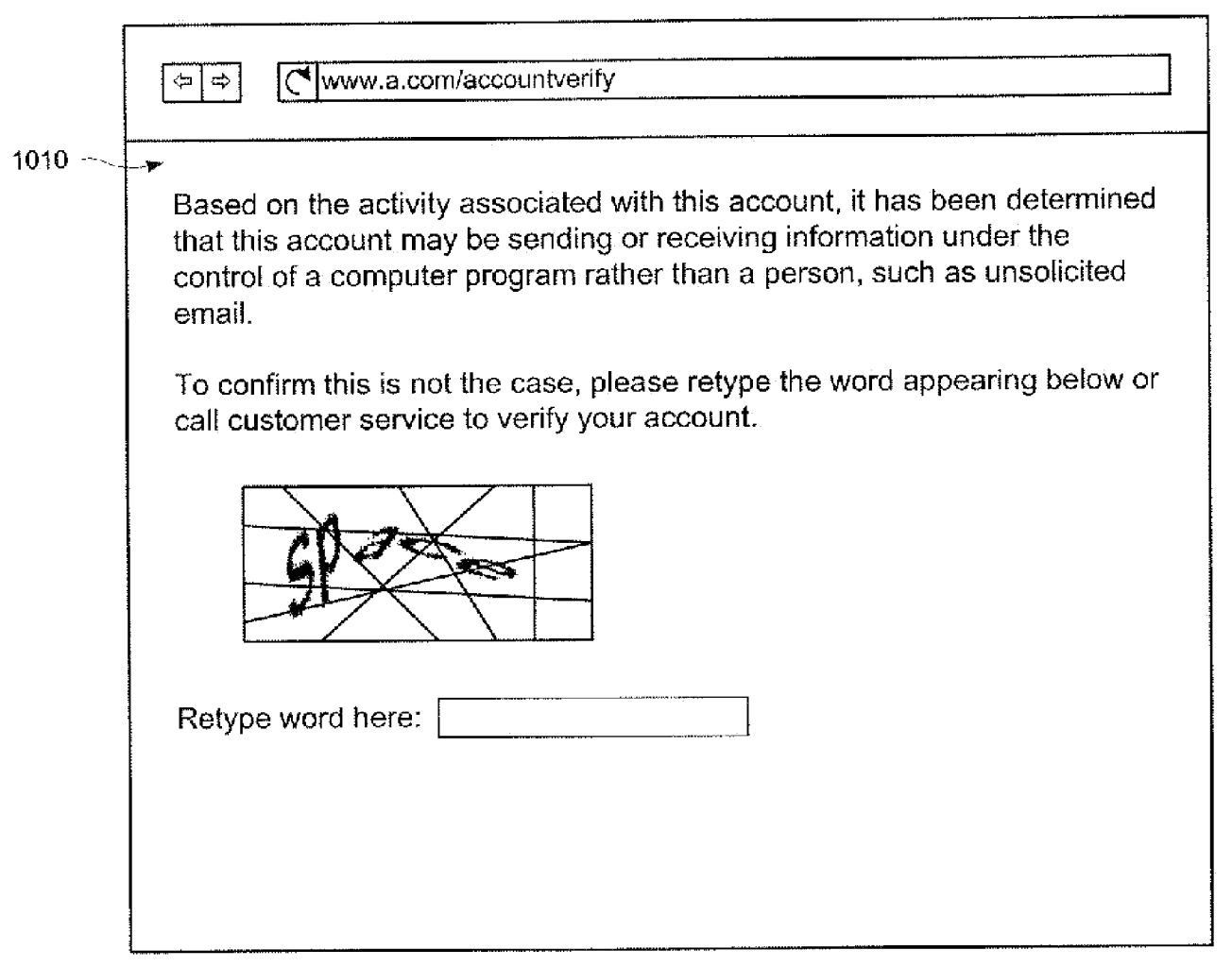
Figure 12:
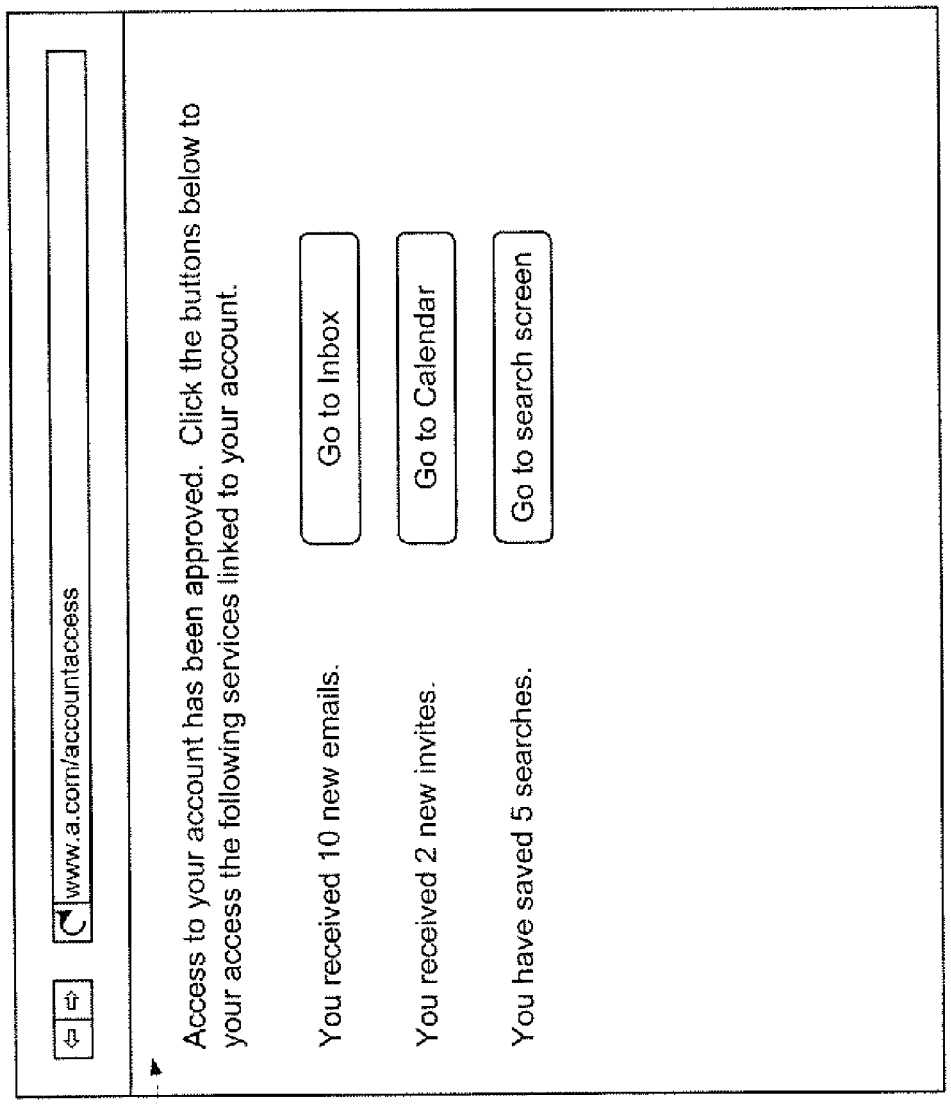
FIG. 12 is a screen shot in accordance with an aspect of the system.

The system may further restrict the information by requiring the account's user to perform actions that require the user to demonstrate that the account is being accessed with active human intervention. For example and as shown in FIG. 10, the server may send any client device a login webpage 1010, to be displayed via the device's browser 1000 on the client device's display, that prompts the user to identify the account based on the user's ID and password. If the server receives a user name associated with an account that has a low humanlike value, the server may send the user a webpage 1110 (FIG. 11) that challenges the user to satisfy a CAPTCHA request, call a customer service representative, or engage in some other activity that is not easily accomplished by a computer program. If the user can satisfy the server's request, or if the account's humanlike value was high enough that no such request was required, the server may provide the user with access to the requested information as shown by webpage in FIG. 12. Otherwise, the server may not provide the requested data.

One of the advantages of the system is its ability to accommodate a wide variety of alternatives and additions to the foregoing features.

For instance, the system may determine the humanlike value based solely on the extent to which other accounts initiated transactions with the account. In that regard, the system may set an initial humanlike value based on a score that indicates the account is primarily operated by a human (e.g., a high number), an automated program (e.g., a low number) or presumptively neither (e.g., an in between number).

On the other hand, the system may rely on transaction information to determine the humanlike value even if does not factor the transaction into its calculation of the interaction value. By way of example, while email sent from a first account to a second account may not be used to determine the interaction value of the first account (because the first account initiated the email), it may still be used to determine the humanlike value of the account if the nature (e.g., topics typically present in spam), quantity (e.g., a high quantity) or frequency (e.g., the duration between the sending of emails is faster than a human could type) of the emails is indicative of automatic generation by a program.

The interaction value may be also be calculated on bases that are not directly proportional to the quantity of transactions. For example, the interaction value may be calculated based on the type of transaction where transactions that are more associated with human interaction are accorded more weight than others. The operator of the system may determine that receiving emails are relatively poor indicator of whether an account is operated by a human, in which case it may assign a fraction of a point to each email. It may be conversely determined that long chats are highly indicative of human activity, in which case each such chats is ascribed more points.

Yet further, not all aspects of the system will factor every transaction into its calculation of the interaction value or humanlike value. For example, the operator of the system may determine that the reception of emails is a very poor indicator of whether an account is operated by a human, in which case the interaction value may be calculated based on the type of transaction by ignoring certain types of transactions.

The system may also use different criteria to determine the quantity of transactions. In that regard, a single chat session may be considered one transaction, or each message sent by an account in a single chat session may be considered its own transaction.

In still another aspect, the quantity of transactions is ignored beyond the existence of the transactions; the system merely determines whether at least one (or more) qualifying transactions occurred and, if so, the humanlike value from the initiator account is applied to the target account. The system might thus assign a value of 100% to the U→V interaction value of Account V as long as Account U sent a single calendar or chat invite to Account V. In this aspect, the humanlike value would be based primarily on the non-transactional components of the initiator's and target's humanlike values.

A different aspect relies extensively on the extent of the transactions and ignores the humanlike value of the source. For example, the boost to Account V might depend solely on the U→V interaction value rather than the humanlike value of Account U.

In still another aspect, the system applies different weights to the different components. For instance, the boost function may be defined as follows:

$$Boost(v) = \Sigma IterationMod(n) * (W1 * Interaction(u \rightarrow v) + W2 * Human(u)),$$

where:
W1=weight to be applied to interaction value.
W2=weight to be applied to humanlike value of the initiating account.

Greater or lesser emphasis may be placed on the nature of the interactions versus the humanlike value of the initiator.

The dampening function is not limited to the exponential iteration modifier described above. By way of example only, the dampening function may decrease the boost by a set amount each iteration.

The system may also rely on alternative methods of propagating boosts to humanlike values. As noted above, the system may iterate over each account in series, total all of the boosts from the initiators, apply the boosted value to other targets, and repeat the process numerous times.

Figure 13:
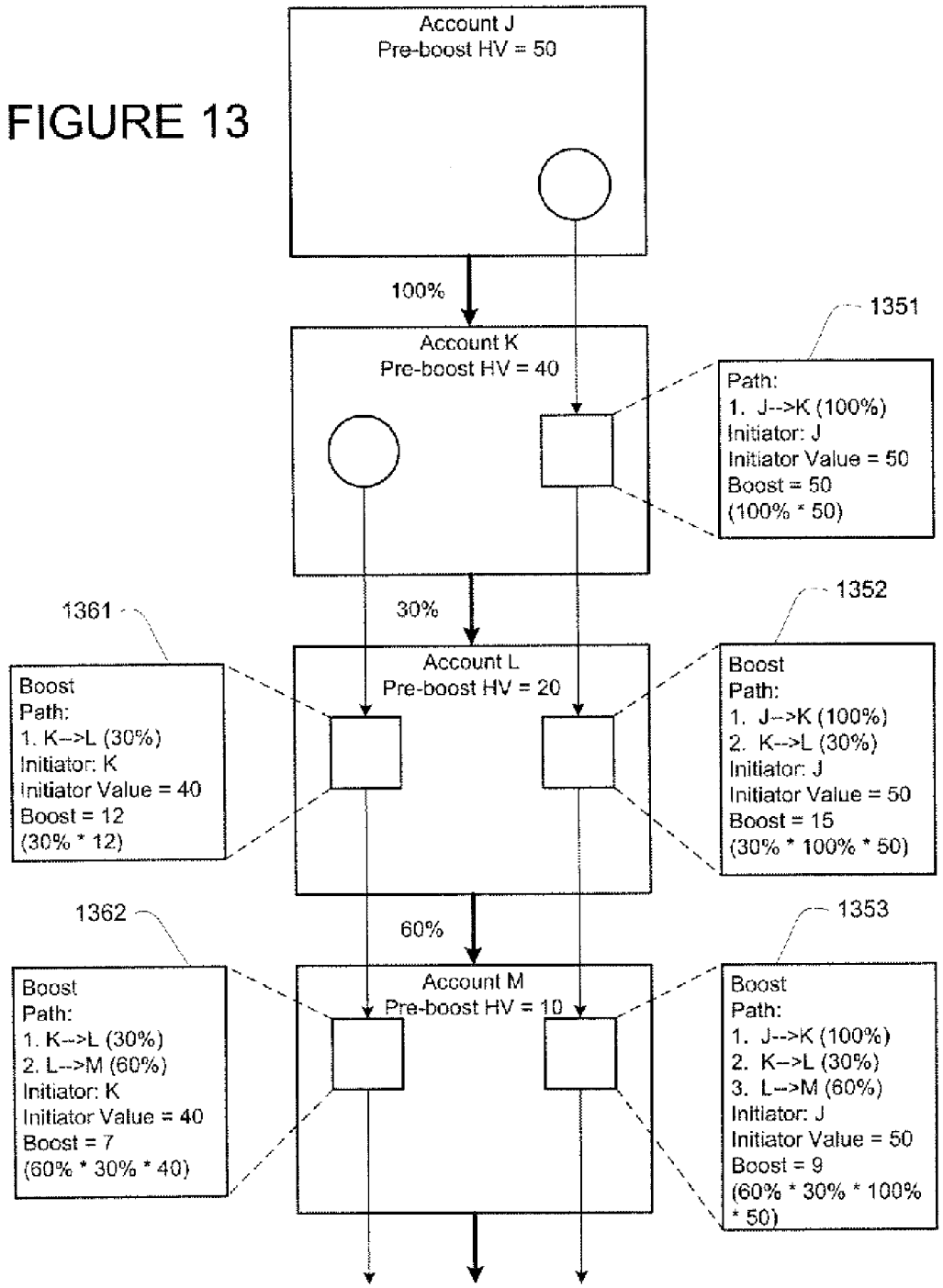
FIG. 13 is a flow chart with sample data in accordance with an aspect of the system.

In another aspect, the system may track each boost from each original initiator individually and in parallel, and propagate the boosts throughout the system. As shown by way of example in FIG. 13, the system calculated initial humanlike values for Accounts J, K, L and M (based solely on information unrelated to interactions with other accounts) of 50, 40, 20 and 10 points, respectively. It also calculated interaction values from Accounts J to K, K to L, and L to M of 100%, 30% and 60% respectively.

When the system applies a boost 1351 from Account J to Account K, it may calculate the boost as described above, i.e., it calculates a boost based on the J→K interaction value of 100% and Account J's humanlike value of 50. Account K's boosted humanlike value would thus be increased by 50 points.

However, rather than next iterating through each account in the system and recalculating humanlike values, the system may immediately propagate the boost that originated at Account J as a boost 1352 to Account L. In that regard, the system may track the path of the boost as it propagates. Accordingly, when the system applies the boost 1352 to Account L, it does so based on all of the intervening interaction values from the originator, e.g., 15 point boost=100% [J→K interaction value]*30% [K→L interaction value]*50 point [pre-boost humanlike value of originator Account J].

The system may similarly and immediately thereafter pass and apply the boost yet again as boost 1353 to Account M, as well as any other account with which Account L initiated a transaction.

The system may continue to propagate the boost until it is terminated. For example, the system may cease propagating a boost when it determines that it has been passed by a predetermined number of nodes, or the amount of the boost drops below a threshold value. Even if the impact of a boost inherently decreases over time (as would occur if the boost value is a multiple of an interaction value (IV) having the property 0<IV<=1), the decreasing nature of the propagated boost value may be enhanced or forced by the application of a dampener.

The system may also prevent the boost from being applied or passed to an account that it has visited before. For example, if Account M initiated transactions with Accounts J or K, boost 1353 would not be passed along to those accounts because its path indicates that it has already been passed along by those accounts. In this regard, and alternative to an aspect described above, an account will not obtain a boost based on its own initial humanlike value and direct communication (e.g., bilateral communication with an account) or indirect communication (e.g., three accounts form a circular loop) with other accounts.

Any other account having a pre-boost humanlike value may create similar boosts that are individually applied throughout the system, such as boosts 1361 and 1362 that originate with Account K. In that regard, the system and method shown in FIG. 13 may be particularly advantageous when used in connection with parallel processing systems.

Yet further, the system may apply the boosts at various times. The boost may not be added to the humanlike values until all of the individual boosts within the system have been terminated. Alternatively, the boosts may be applied to the humanlike value of an account as soon as it arrives. In that regard, when the system uses a humanlike value to determine whether an account is primarily operated by a human, it may use the then-current humanlike value in spite of the fact that other boosts may be travelling towards the account.

Regardless of the manner in which the boost is calculated, the system may use the humanlike value for a variety of purposes in addition to those described above. For example, it may identify accounts for further investigation by a company representative, detect whether email sent from the account is spam, detect the likelihood of a blog post or comment from an account being spam, detect payment fraud, detect click fraud (e.g., whether the account is being used by a computer that automatically clicks certain advertisements), perform service stratification and the like.

The system may also monitor the transactions rather than performing them. For instance, each client devices may be associated with a unique identifier or a unique network address and transmit messages to each other without going through the server. In that regard, the server may monitor or later obtain information identifying these transactions and use the unique identifiers or network address as the account identifier.

In other aspects, functions described above as being performed by the server may be performed by the client device, and vice versa. For example, rather than providing client devices with access to accounts, the server 110 may track transactions that occur directly between client device's. In yet more aspects, the client device and server perform and share different functions.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computerized method of restricting access to information available via user accounts, the method comprising:
   determining, with a processor of a computer, for a first user account, a humanlike value indicative of the extent to which the first user account has the characteristics of sending or receiving data based on the active participation of a human instead of a computer program,
   determining an interaction value with the processor, where interaction value is based on (1) a number of message transactions sent from the first user account to a second user account, (2) the number of message transactions received by the first user account and sent by the second user account, and (3) the types of the message transactions between the first user account a second user account;
   determining, with the processor and for the second user account, a humanlike value based on the humanlike value of the first user account and the interaction value.

2. The method of claim 1, wherein the types of the message transactions include instant messages sent between the first user account and the second user account.

3. The method of claim 1 wherein the types of the message transactions include calendar meeting invites sent between the first account to the second account.

4. The method of claim 1, further comprising:
   receiving a request for data from a user associated with the second user account;
   selecting information to display to the user based on the humanlike value of the second user account and in response to the request; and
   sending the selected information from the computer system to the user.

5. The method of claim 1, wherein the types of the message transactions includes email messages.

6. The method of claim 4, wherein the selected information comprises, when the humanlike value of the second user account indicates that the second user account has the characteristics of sending or receiving data without the active participation of a human, a challenge configured to determine whether the request was generated by a computer without the active participation of a human.

7. The method of claim 4 wherein the selected information, when the third value indicates that the account has the characteristics of sending or receiving data with the active participation of a human, the requested data.

8. A system comprising:
   a first computer at a first node of a network, the first computer having access to a set of instructions operable by the first computer, user account data identifying user accounts accessing data over the network, humanlike values associated with the users, and interaction data including the number of message transactions sent from the user account to other user accounts, the number of message transactions received by the user account and sent by the other user accounts, and the types of the message transactions between the user and the other user accounts; and
   a client device at a second node of the network different from the first node, the device comprising a user input device, an electronic display, a processor and instructions operable by the processor;
   the instructions of the client device comprising:
      transmitting an identification of the user to the first computer,
      transmitting a request for information to the first computer, and
      displaying, on the electronic display, the information transmitted by the first computer, and
   the instructions of the first computer comprising:
      receiving the identification of the user and the request for information from the client device, and
      transmitting either the requested information or other information depending on a first value associated with the user,
   wherein the first value is based on the interaction data, and the likelihood that the other users used a computer program to automatically generate and transmit information to other users.

9. The system of claim 8 wherein the network is the Internet.

10. The system of claim 8 wherein the first computer is a web server.

11. A system comprising:
a processor;
instructions operable by the processor;
an electronic memory storing the instructions; and
an electronic memory storing data accessed by the processor;
the instructions comprising:
  determining, for each user account within a set of user accounts identified by the data stored in the memory, an interaction value based on the number of message transactions sent from that user account to other user accounts, the number of message transactions received by that user account and sent by the other user accounts, and the types of the message transactions between that user and the other user accounts;
  determining, for each user within the set of users, a program-likelihood value based on the likelihood that the user account is using a computer program to automatically generate and send information to other user accounts within the set;
  iterating through the user accounts and modifying the program-likelihood value of each user based on the interaction value of the user account until a termination criteria is satisfied; and
  restricting access by a particular user account to the information dependent on a comparison of the particular user account's program-likelihood value with a threshold.

12. The system of claim 11 wherein the modification of the program-likelihood value based on the message-amount value decreases with each repetition of the iterating.

13. The system of claim 12 wherein decreasing the message-amount value comprises exponentially decreasing the impact of the message-amount value with each iteration.

14. The system of claim 11 wherein the termination criteria comprises repeating the iterating a predetermined number of times.

15. The system of claim 11 wherein the termination criteria comprises modification of program-likelihood value being less than a predetermined threshold.

16. The system of claim 11 wherein the modification of the program-likelihood value of a user account is based on the function $\Sigma$ (Message-Amount(u→v) [@] Program-Likelihood(u)), where:
v=the user account;
u=a user account from which user account v received messages;
Message-Amount(u→v)=a value based on the number of messages received by user account v from user account u;
Program-Likelihood value (u)=a value based on the likelihood that user account u is using a computer program to automatically generate and send information to other user accounts with the set;
[@]=one or more mathematical operations; and
$\Sigma$=sum based on all user accounts from which user v received messages.

17. The system of claim 11 wherein the modification of the program-likelihood value of a user is based on the function $\Sigma$ (Message-Amount(u→v) [@] Program-Likelihood(u) [@] Iteration(n)), where:
v=the user account;
u=a user account from which user account v received messages;
Message-Amount (u→v)=a value based on the number of messages received by user account v from user account u;
Program-Likelihood value (u)=a value based on the likelihood that user account u is using a computer program to automatically generate and send information to other users with the set;
[@]=one or more mathematical operations;
$\Sigma$=sum based on all user accounts from which user account v received messages; and
Iteration(n)=a value based on the number of times the function has been calculated for user account v.

18. A non-transitory, computer-readable medium having instructions stored thereon that, when executed by a processor, cause the processor to perform a method, the method comprising:
determining for a first user messaging account, a humanlike value indicative of the extent to which the first user messaging account has the characteristics of sending or receiving data based on the active participation of a human instead of a computer program,
determining an interaction value with a processor, where interaction value is based on (1) a number of message transactions sent from the first user messaging account to a second user messaging account, (2) the number of message transactions received by the first user messaging account and sent by the second user messaging account, and (3) the types of the message transactions between the first user messaging account and the second user messaging account;
determining with a processor and for the second user messaging account, a humanlike value based on the humanlike value of the first user messaging account and the interaction value; and
restricting access by the second user messaging account to information available via the second user messaging account depending on the second user messaging account's humanlike value.

19. The method of claim 1, wherein the humanlike value of the second user account is further based on the number of search requests made by a user via the second user account.

* * * * *

UNITED STATES PATENT AND TRADEMARK OFFICE
CERTIFICATE OF CORRECTION

| | | |
|---|---|---|
| PATENT NO. | : 9,058,478 B1 | Page 1 of 1 |
| APPLICATION NO. | : 12/534369 | |
| DATED | : June 16, 2015 | |
| INVENTOR(S) | : Karanjkar et al. | |

It is certified that error appears in the above-identified patent and that said Letters Patent is hereby corrected as shown below:

On the title page [*], Notice, delete "This patent is subject to a terminal disclaimer."

Signed and Sealed this
Third Day of November, 2015

Michelle K. Lee
*Director of the United States Patent and Trademark Office*